(12) United States Patent
Kerstetter et al.

(10) Patent No.: US 12,393,347 B2
(45) Date of Patent: Aug. 19, 2025

(54) WEAR LEVELING REPAIR IN A MEMORY DEVICE

(71) Applicant: Micron Technology, Inc., Boise, ID (US)

(72) Inventors: Bryan D. Kerstetter, Kuna, ID (US); Alan J. Wilson, Boise, ID (US); Donald M. Morgan, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/653,300

(22) Filed: May 2, 2024

(65) Prior Publication Data

US 2024/0370176 A1    Nov. 7, 2024

Related U.S. Application Data

(60) Provisional application No. 63/464,019, filed on May 4, 2023.

(51) Int. Cl.
*G06F 3/06* (2006.01)

(52) U.S. Cl.
CPC .......... *G06F 3/0616* (2013.01); *G06F 3/0659* (2013.01); *G06F 3/0679* (2013.01)

(58) Field of Classification Search
CPC ..... G06F 3/0616; G06F 3/0659; G06F 3/0679
See application file for complete search history.

(56) References Cited

U.S. PATENT DOCUMENTS

| 10,811,112 | B2 | 10/2020 | Helmick et al. |
| 2010/0174845 | A1* | 7/2010 | Gorobets ............ G06F 12/0246 711/E12.001 |
| 2019/0310780 | A1 | 10/2019 | Gholamipour et al. |
| 2020/0266838 | A1* | 8/2020 | Porter ................ H03M 13/2906 |
| 2024/0211146 | A1* | 6/2024 | Sun ........................ G06F 3/0679 |

\* cited by examiner

*Primary Examiner* — Larry T Mackall
(74) *Attorney, Agent, or Firm* — Brooks, Cameron & Huebsch, PLLC

(57) ABSTRACT

Systems, methods, and apparatuses are provided for wear leveling repair in a memory device. A host is configured to issue a wear leveling command and a repair request to a memory device configured to check source data in a memory of the memory device for errors in response to receiving the wear leveling command from the host, transfer source data in the memory of the memory device to a target page, and repair a source page if the source data includes an error. The memory device is further configured to set a new repair match if a wear leveling repair element was not consumed after receiving the repair request and flush a previous repair match before setting the new repair match if the wear leveling repair element was consumed and a physical address of an incoming repair request is associated with the wear leveling repair element.

20 Claims, 7 Drawing Sheets

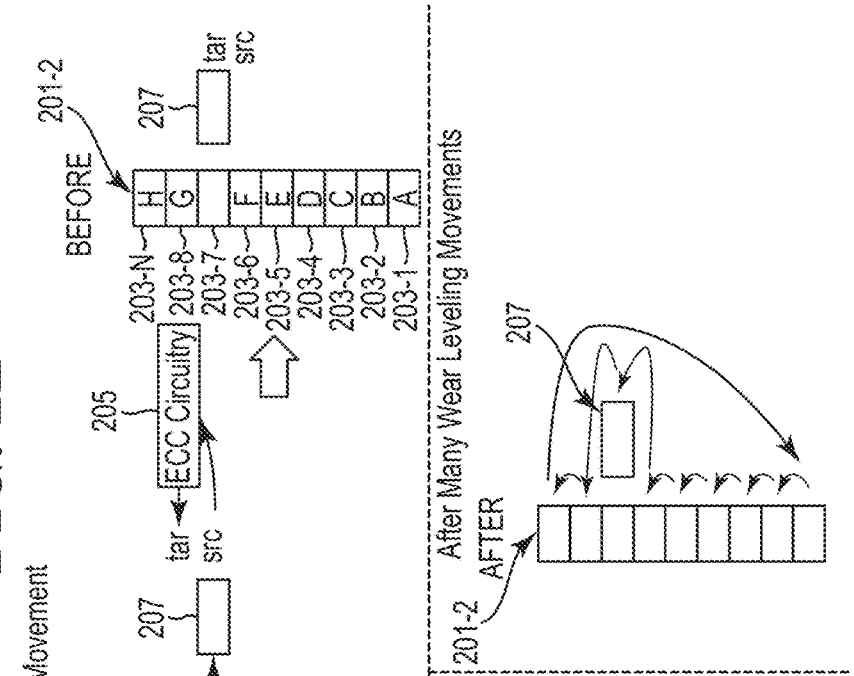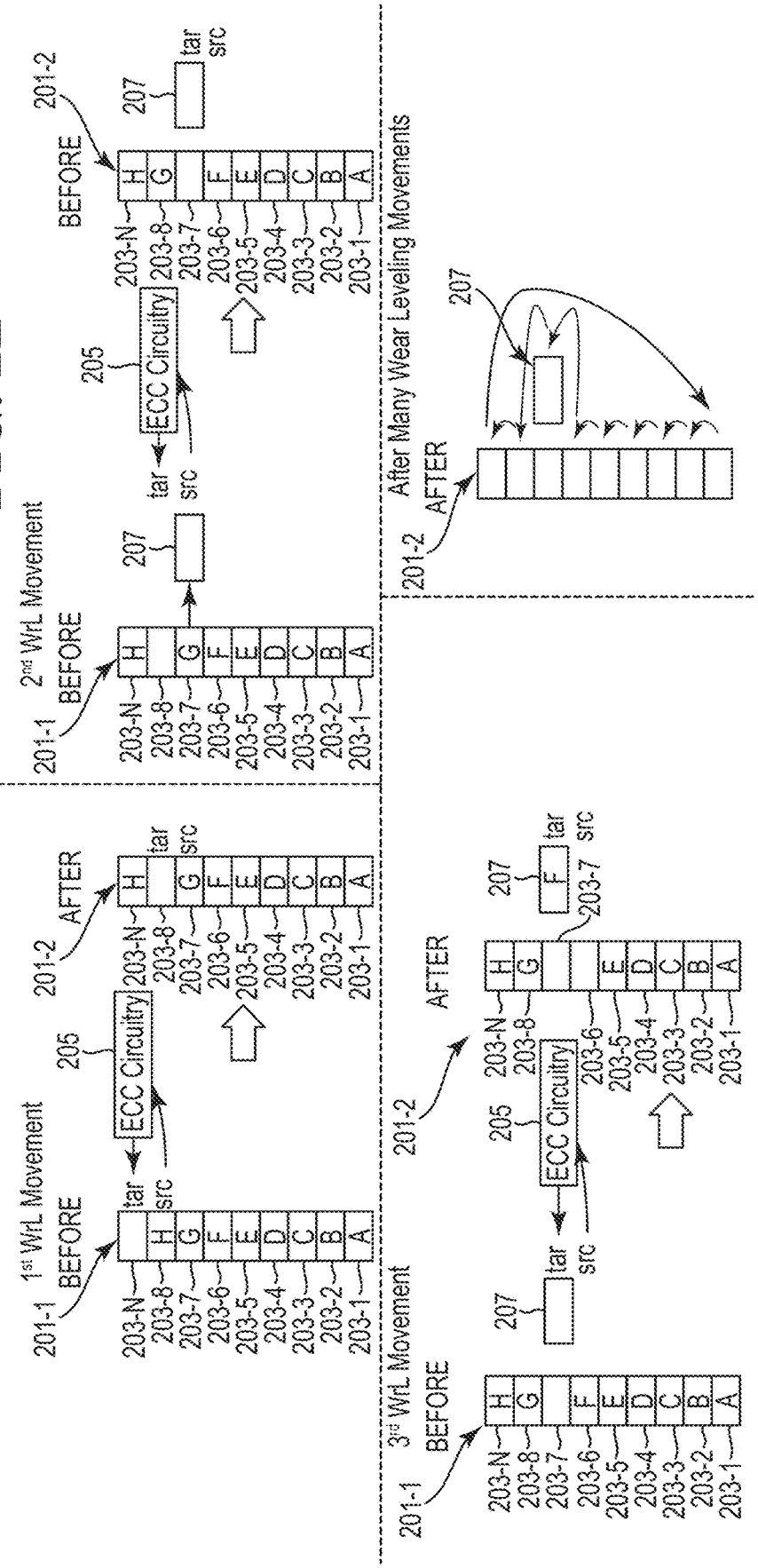

WEAR LEVELING REPAIR IN A MEMORY DEVICE

PRIORITY INFORMATION

This application claims the benefit of U.S. Provisional Application No. 63/464,019, filed on May 4, 2023, the contents of which are incorporated herein by reference.

TECHNICAL FIELD

Embodiments of the disclosure relate generally to a memory sub-system, and more specifically, relate to wear leveling repair in a memory device.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), and resistance variable memory such as phase change random access memory (PCRAM), resistive random access memory (RRAM), ferroelectric random access memory (FERAM), magnetic random access memory (MRAM), and programmable conductive memory, among others.

Memory devices can be utilized as volatile and non-volatile memory for a wide range of electronic applications in need of high memory densities, high reliability, and low power consumption. Non-volatile memory may be used in, for example, personal computers, portable memory sticks, solid state drives (SSDs), digital cameras, cellular telephones, portable music players such as MP3 players, and movie players, among other electronic devices.

Memory devices can include memory cells that can store data based on the charge level of a storage element or can store data based on their conductivity state. Such memory cells can be programmed to store data corresponding to a target data state by varying the charge level of the storage element or by varying the conductivity level of the storage element. For example, sources of an electrical field or energy, such as positive or negative electrical pulses (e.g., positive or negative voltage or current pulses), can be applied to the memory cell (e.g., to the storage element of the cell) for a particular duration to program the cell to a target data state.

A memory cell can be programmed to one of a number of data states. For example, a single level memory cell (SLC) can be programmed to a targeted one of two different data states, which can be represented by the binary units 1 or 0 and can depend on whether the capacitor of the cell is charged or uncharged. As an additional example, some memory cells can be programmed to a targeted one of more than two data states (e.g., 1111, 0111, 0011, 1011, 1001, 0001, 0101, 1101, 1100, 0100, 0000, 1000, 1010, 0010, 0110, and 1110). Such cells may be referred to as multi state memory cells, multiunit cells, or multilevel cells (MLCs). MLCs can provide higher density memories without increasing the number of memory cells since each cell can represent more than one digit (e.g., more than one data bit).

BRIEF DESCRIPTION OF THE DRAWINGS

FIGS. 2A-2D illustrate conceptual examples of wear leveling movements in accordance with an embodiment of the present disclosure.

DETAILED DESCRIPTION

Figure 1:
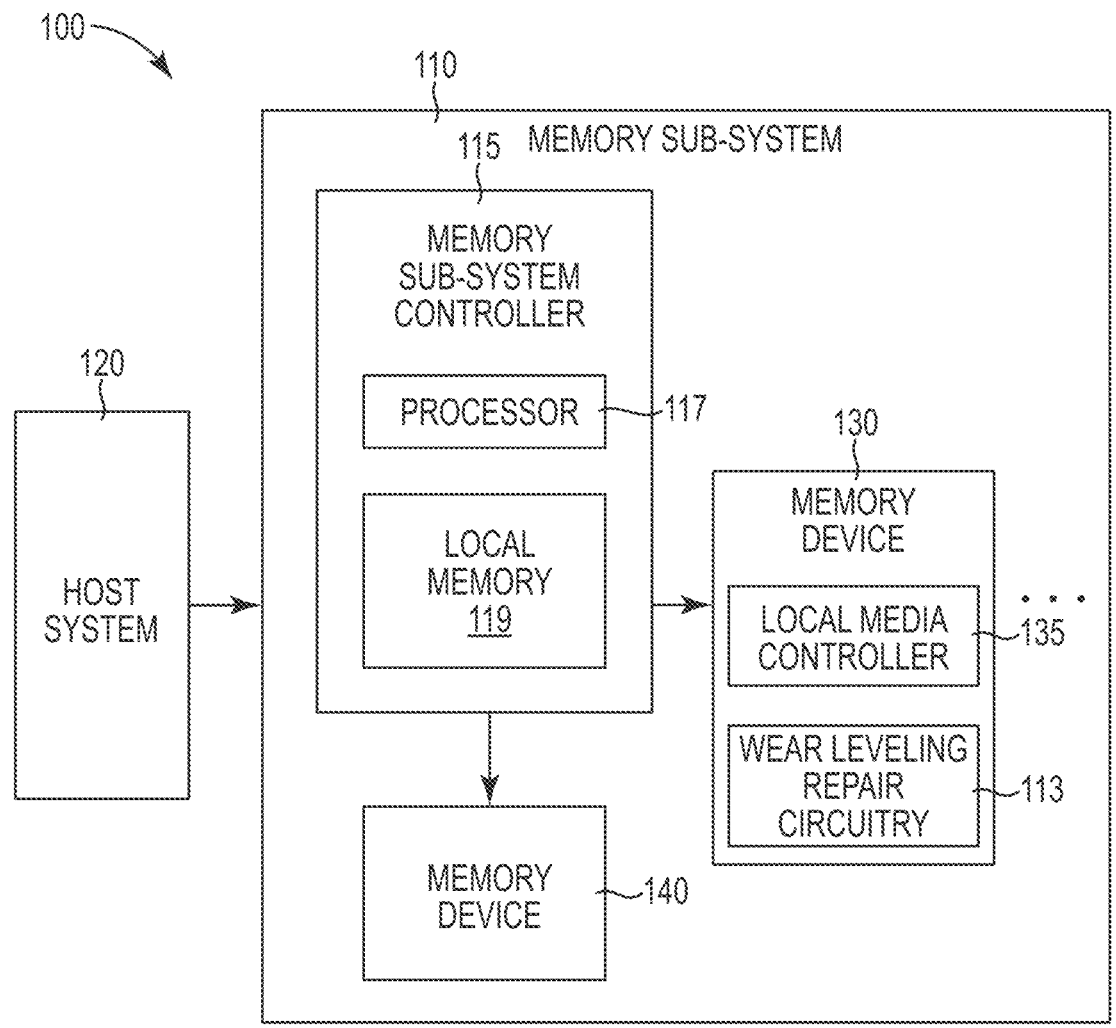
FIG. 1 illustrates an example computing system that includes a memory sub-system in accordance with an embodiment of the present disclosure.

The present disclosure includes apparatuses, methods, and systems for wear leveling repair in a memory device. An embodiment includes a host and a memory device coupled to the host. The host can be configured to issue a wear leveling command to a memory device and issue a repair request to the memory device. The memory device is configured to check source data in a memory of the memory device for errors in response to receiving the wear leveling command from the host, transfer the source data in the memory of the memory device to a target page in the memory, and repair a source page in the memory if the source data includes an error and the wear leveling repair element has not been consumed. The memory device can be further configured to set a new repair match if the wear leveling repair element has not been consumed in response to receiving the repair request from the host and flush a previous repair match prior to setting the new repair match if the wear leveling repair element has been consumed and a physical address of an incoming repair request is a physical address associated with the wear leveling element.

Memory cells can endure a certain amount of memory operations (e.g., activate, program, sense, and/or erase operations) before they wear out (e.g., begin to degrade and/or malfunction). Multiple techniques can be implemented in a memory device to mitigate the effects of such wear. One such technique is wear leveling. As used herein, the term "wear leveling" refers to evenly distributing program (e.g., write) operations throughout the memory cells in a memory device. In one wear leveling example, blocks of memory that are not currently storing data are examined, and the block with the lowest erase count can be selected for the next write operation. Wear leveling circuitry can select an empty block to write the data to. This can be achieved by a controller that keeps track of the number of write operations performed on each block of memory cells. In another wear leveling example, a controller can select a block of memory from the blocks of memory in a memory device as the block to rewrite the data to. The selected block can be a block that has relatively few entries, corresponding to blocks containing static data, or empty blocks. In yet another wear leveling example, a memory device can move stored data through all pages in a pool of pages and reassign addressing to track logical versus physical page locations. Wear leveling can prolong the life of memory cells by decreasing the number of writes performed on certain memory cells due to the writes being evenly distributed amongst the memory cells.

In previous approaches, a page of memory can include uncorrectable errors (e.g., a quantity of erroneous data that is beyond the error correction capabilities of an error correction code (ECC) algorithm for the memory). Any data that moves through that page of memory (e.g., during a wear leveling operation) can be corrupted. As more data becomes corrupted by being moved through that page of memory, the difficulty of identifying the physical page that includes the uncorrectable errors becomes more difficult. Further, all of the data in a memory array can eventually become corrupted since a wear leveling scheme can eventually move all of the data in the memory array through the page of memory that includes uncorrectable errors.

Embodiments of the present disclosure, however, can reduce the amount of data that is moved through a page of memory that has uncorrectable errors during wear leveling operations. For example, embodiments of the present disclosure can direct a wear leveling operation away from the page of memory that has an uncorrectable error. For instance, an ECC scrub can be performed on data before the data is transferred from a source page to a target page. As used herein, the term "ECC scrub" refers to a process of performing an ECC operation on data, correcting the errors in the data, and writing the corrected data back to a page of memory. If an uncorrectable error is detected during the ECC scrub, a repair (e.g., wear leveling soft repair (WLSR)) operation can be initiated to repair the source page. Future wear leveling operations can then divert data through the repaired page of memory instead of the page of memory with the uncorrectable errors. This can decrease the amount of data that is corrupted by decreasing the amount of data moving through the corrupted page of memory, which can improve the performance and/or reliability of the memory. Embodiments of the present disclosure can also increase the difficulty of a malicious user (e.g., hacker) initiating a wear leveling attack on the memory device by increasing the difficulty of tracking physical failures through logical address spaces across iterations of wear leveling movements.

As used herein, "a," "an," or "a number of" can refer to one or more of something, and "a plurality of" can refer to two or more such things. For example, a memory device can refer to one or more memory devices, and a plurality of memory devices can refer to two or more memory devices. Additionally, the designator "N" as used herein, particularly with respect to reference numerals in the drawings, indicates that a number of the particular feature so designated can be included with a number of embodiments of the present disclosure.

FIG. 1 illustrates an example computing system 100 that includes a memory sub-system 110 in accordance with an embodiment of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, the term "coupled to" or "coupled with" can refer to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via an interface (e.g., a physical host interface). Examples of an interface can include, but are not limited to, a serial advanced technology attachment (SATA) interface, a peripheral component interconnect express (PCIe) interface, universal serial bus (USB) interface, Fibre Channel, Small Computer System Interface (SCSI), Serial Attached SCSI (SAS), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), Universal Serial Bus (USB), or any other interface. The interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The interface can provide a way for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type memory (e.g., 2D NAND, 3D NAND) are described, the memory device 130 can be based on any other type of non-volatile memory or storage device, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g. processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correction code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface (not pictured) circuitry to communicate with the host system 120 via a physical host interface (not pictured). The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes wear leveling repair circuitry 113. In some embodiments, the wear leveling repair circuitry 113 is located on a memory device 130. In some embodiments, the wear leveling repair circuitry 113 can include ECC circuitry to scrub the source data, soft post package repair (sPPR) circuitry to perform soft repairs on pages of data in the memory device 130, and hard post package repair (hPPR) circuitry to perform hard repairs on pages of data in the memory device 130. As used herein, the term "soft repair" refers to a repair performed on data that does not persist if the memory device loses power. As used herein, the term "hard repair" refers to a repair that does persist if the memory device loses power. The memory device 130 can perform a soft repair or a hard repair on a page of memory when an uncorrectable error is detected in a page of memory during an ECC scrub. Alternatively, in some embodiments, the host 120 can perform a soft repair or a hard repair on a page of memory when the host 120 detects an uncorrectable error in that page.

In some embodiments, the memory device 130 can include high yielding components. As used herein, the term "high yielding component" refers to a memory component that can undergo more operations before failure than components that are not high yielding components. Correctable errors can occur less often in high yielding components than in components that are not high yielding components. In memory devices that include high yielding components, an automatic row replacement and/or an automatic page repair can be initiated when a correctable error is detected. For example, the page that experienced a correctable error can be repaired by a wear leveling repair element (e.g., a wear leveling soft repair (WLSR) element). In some embodiments, errors corrected by an ECC scrub can be permanently corrected. Alternatively, in a memory component that is not a high yielding component, an automatic row replacement and/or an automatic page repair may not occur when a correctable error is detected due to an increased likelihood of correctable errors occurring. Instead, in this example, an automatic row replacement and/or automatic page repair can be initiated when an uncorrectable error is detected. In this example, the error cannot be corrected by an ECC scrub so the error will still exist within the memory device, but the page that triggered the error is repaired. In some embodiments, the WLSR element may be applied to a non-algebraic wear leveling scheme. Further, in some embodiments, multiple wear leveling repair elements may be available to repair multiple pages that are found to have errors during wear leveling.

FIG. 2A illustrates a conceptual example of a wear leveling movement in accordance with an embodiment of the present disclosure. FIG. 2A includes memory cell arrays 201-1, and 201-2 (individually or collectively referred to as memory cell array 201) having memory pages 203-1, 203-2, . . . , 203-N (individually or collectively referred to as memory pages 203), and ECC circuitry 205.

Memory array 201-1 illustrates the storage (e.g., location) of data before a first wear leveling movement occurs. For example, source data (e.g., "H") can be stored in a source page (e.g., page 203-8). Notwithstanding physical movement for wear leveling, data A-H can remain linked by tracking logic (not shown) to their original logical addresses. Further, at any given time, data A-H may reside in different physical addresses (e.g., 203-1 to 203-N), but will always be associated with their original logical address due to logical to physical address translation logic (not shown). An ECC scrub can be performed on the source data by the ECC circuitry 205 before the source data is moved from the source page 203-8 to a target page (e.g., page 203-N). In the example shown in FIG. 2A, no uncorrectable error was detected during the ECC scrub. Therefore, a controller (e.g., controller 115 in FIG. 1) may not initiate a wear leveling repair (e.g., a WLSR) to repair the source page 203-8. In some embodiments, the ECC scrub can be performed by the controller.

Memory array 201-2 illustrates the memory array 201 (e.g., the storage of data in the array) after the first wear leveling movement has occurred (e.g., been performed). In memory array 201-2, the source data (e.g., "H") has been transferred from source page 203-8 to target page 203-N (the target page in memory array 201-1).

FIG. 2B illustrates a conceptual example of a second wear leveling movement in accordance with an embodiment of the present disclosure. Memory array 201-1 in FIG. 2B illustrates the memory array 201 (e.g., the storage of data in the array) after the first wear leveling movement described in connection with FIG. 2A has occurred. The second wear leveling movement can move the source data (e.g., data "G") from a source page (e.g., page 203-7) to a target page (e.g., page 203-8). Before the second wear leveling movement completes, the ECC circuitry 205 can perform an ECC scrub on the source data. In the example illustrated in FIG. 2B, an uncorrectable error may be detected during the ECC scrub (e.g., due to page 203-7 being physically bad). A WLSR can be initiated and performed (e.g., by the controller) in response to the uncorrectable error being detected. The WLSR can use a WLSR element 207 to perform a soft repair on the source page. As used herein, the term "WLSR element" refers to a page of memory to which data is diverted during a wear leveling movement from a page of memory that includes an uncorrectable error. The "WLSR element" also refers to a repair element to which an access to the physical address is redirected.

Memory array 201-2 illustrates the memory array 201 (e.g., the storage of the data in the array) after the second wear leveling movement has occurred (e.g., been performed). In memory array 201-2 in FIG. 2B, the source data (e.g., data "G") has been transferred from the source page 203-7 to the target page 203-8.

FIG. 2C illustrates a conceptual example of a third wear leveling movement in accordance with an embodiment of the present disclosure. In FIG. 2C, the memory array 201-1 illustrates the memory array 201 (e.g., the storage of data in the array) after the second wear leveling movement described in connection with FIG. 2B has occurred and before the third wear leveling movement has occurred. The third wear leveling movement can attempt to move the source data (e.g., data "F") from a source page (e.g., page 203-6) to a target page (e.g., page 203-7). The ECC circuitry 205 can perform an ECC scrub on the source data before the data is moved. In the example shown in FIG. 2C, an uncorrectable error may not be detected during the ECC scrub. Therefore, a WLSR may not be initiated by the controller.

Memory array 201-2 illustrates the memory array 201 (e.g., the storage of data in the array) after the third wear leveling movement has occurred (e.g., been performed). As described in connection with FIG. 2B, a WLSR was performed on the source page (e.g., page 203-7) to repair the source page. Therefore, instead of data "F" being transferred to page 203-7 during the wear leveling movement, data "F" can be transferred to the WLSR element 207, as illustrated in FIG. 2C.

FIG. 2D illustrates a conceptual example of multiple wear leveling movements in accordance with an embodiment of the present disclosure. In FIG. 2D, memory array 201-2 illustrates a memory array after multiple wear leveling movements have occurred. The wear leveling movements can transfer data from a source page 203 to a target page 203, as illustrated in FIG. 2D. However, memory page 203-7 was previously repaired using a WSLR, as described in connection with FIG. 2C. Therefore, in the example illustrated in FIG. 2D, instead of transferring source data to page 203-7 when page 203-7 is the target page, the data can be diverted to the WSLR element 207. This can prevent the uncorrectable error in memory page 203-7 from corrupting more data by preventing the data from moving through memory page 203-7.

Figure 3:
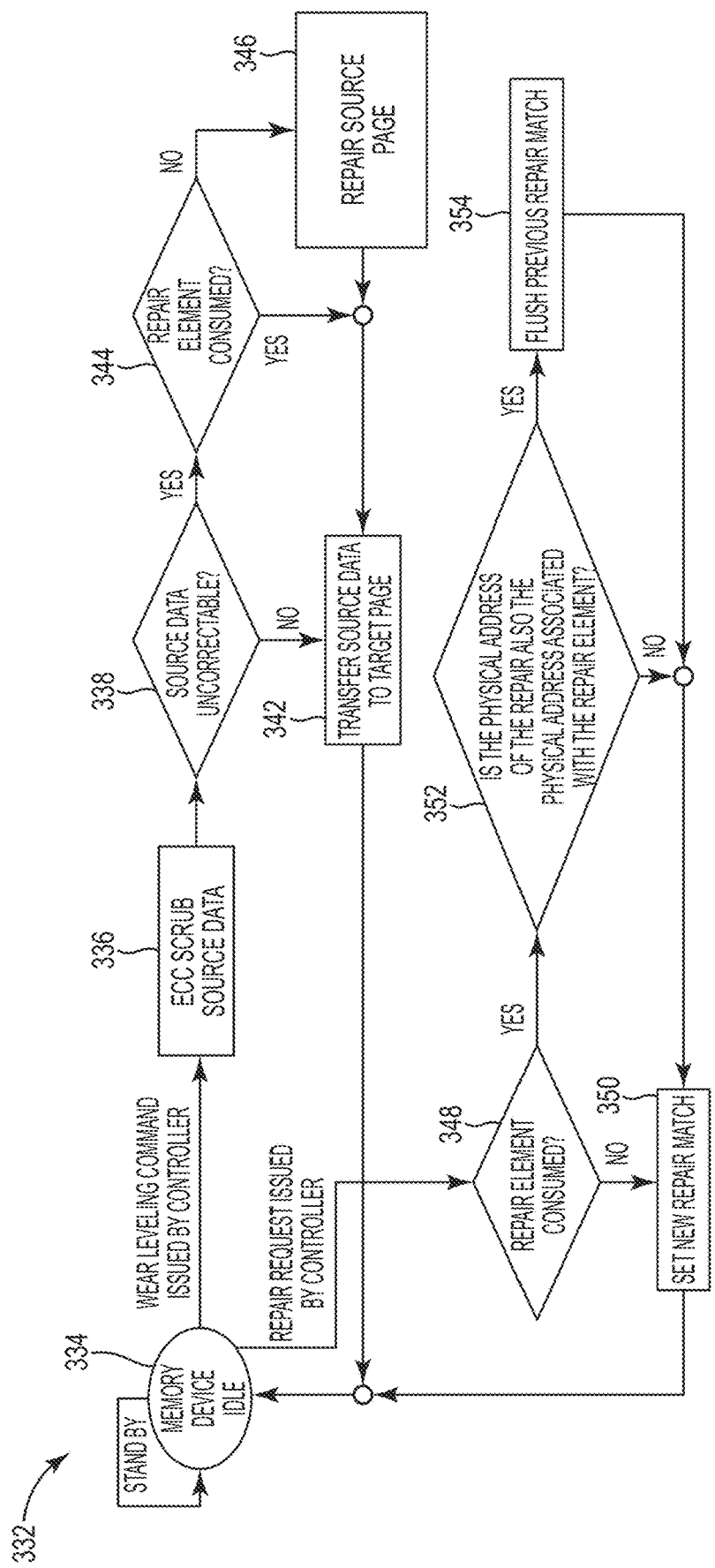
FIG. 3 is a flow diagram illustrating a method of wear leveling repair in a memory device in accordance with an embodiment of the present disclosure.

FIG. 3 is a flow diagram illustrating a method 332 for wear leveling repair in a memory device (e.g., memory device 130 previously described in connection with FIG. 1) in accordance with an embodiment of the present disclosure.

The method 332 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. As an example, the method 332 can be performed by wear leveling repair circuitry 113 previously described in connection with FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 334, the method 332 can include a memory device being idle (e.g., not executing any commands). The idle memory device can receive, from a host (e.g., host system 120 described in connection with FIG. 1), a wear leveling command. At block 336, the method 332 can include scrubbing, by the memory device using ECC circuitry, source data in response to receiving the wear leveling command. In some embodiments, the wear leveling command can initiate a full wear leveling movement or a portion of a wear leveling movement.

At block 338, the method 332 can include determining whether the source data includes an uncorrectable error. In some embodiments, the data can include an uncorrectable error due to the data being stored in a page of memory that includes an uncorrectable error. At block 342, the method 332 can include transferring the source data to a target page in the memory device in response to determining the source data does not include an uncorrectable error.

At block 344, the method 332 can include determining whether a wear leveling repair (e.g., a single WLSR) element is consumed. A WLSR element is considered "consumed" when the WLSR element is assigned to a physical address and, therefore, may not be assigned to a different physical address. In some embodiments, source data can be transferred to the target page in response to determining the source data includes an uncorrectable error and determining a WLSR element is consumed, as illustrated at block 342.

At block 346, the method 332 can include repairing a source page in response to determining the source data includes an uncorrectable error and determining a WLSR element has not been consumed. In some embodiments, the repair can be automatically performed immediately after determining the WLSR element was not consumed. Further, in some embodiments, the source page can be repaired using a temporary volatile page repair. The temporary volatile page repair can include performing a repair (e.g., sPPR) request or performing a WLSR. If the temporary page repair is performed using a WLSR, a WLSR element can be consumed while the source page is being repaired. In some embodiments, the temporary volatile page repair can be performed after each power up cycle of the memory device in which the temporary volatile page repair repairs a physical memory address associated with a page in the memory that includes an uncorrectable error. In some embodiments, a repair performed by a temporary page repair can be deleted (e.g., lost) responsive to the memory device in which the repair was performed losing power. At block 342, the method 332 can include transferring the source data to a target page in response to the source page being repaired.

The idle memory device can also receive, from the host, a repair (e.g., sPPR) request. At block 348, the method 332 can include determining whether a single WLSR element is consumed in response to the memory device receiving the sPPR request. In some embodiments, the sPPR request can be issued by the host after the wear leveling command has been issued. At block 350, the method 332 can include setting a new sPPR match in response to determining the WLSR element is not consumed. Setting a sPPR match can include assigning a page of memory for use in a soft repair of data in a memory page.

At block 352, the method 332 can include determining whether a physical address of (e.g., associated with) the sPPR request is the physical address associated with the WLSR element in response to determining the WLSR element is consumed. In some embodiments, a new sPPR match can be set, as shown at block 350 of method 332, in response to determining the physical address of the incoming sPPR element is not the physical address associated with the WLSR element.

At block 354, the method 332 can include flushing the previous sPPR match if the wear leveling repair element has been consumed and the physical address of the sPPR request is the physical address associated with the wear leveling repair element. Flushing the previous sPPR match can include canceling the association between the sPPR and the associated physical address. In some embodiments, a new sPPR match can be set, as shown at block 350, in response to flushing the previous sPPR match.

Figure 4:
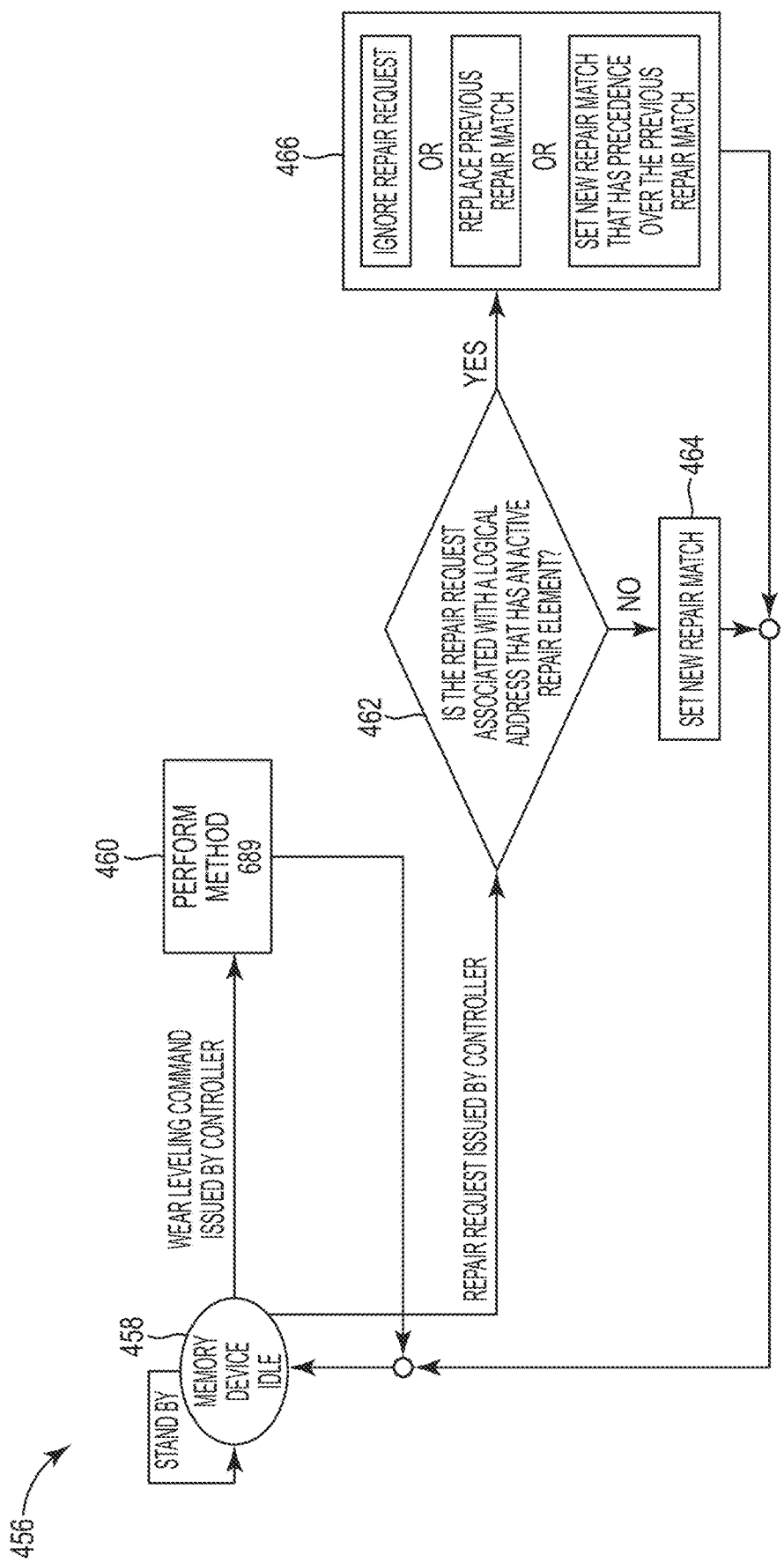
FIG. 4 is a flow diagram illustrating a method of wear leveling repair in a memory device in accordance with an embodiment of the present disclosure.

FIG. 4 is a flow diagram illustrating a method 456 for wear leveling repair in a memory device (e.g., memory device 130 previously described in connection with FIG. 1) in accordance with an embodiment of the present disclosure. The method 456 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. As an example, the method 456 can be performed by wear leveling repair circuitry 113 previously described in connection with FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 458, the method 456 can include a memory device being idle. The memory device can receive, from a host (e.g., host system 120 described in connection with FIG. 1), a wear leveling command. At block 460, the method 456 can include performing the method 689 described later in connection with FIG. 6 in response to the memory device receiving the wear leveling command.

At block 462, the method 456 can include determining whether a sPPR request is associated with a logical address that has (e.g., is associated with) an active wear leveling repair (e.g., WLSR) element in response to the memory device receiving the sPPR from the host. The memory device can receive the sPPR request independent of receiving the wear leveling command. At block 464, the method 456 can include setting a new sPPR match in response to determining the sPPR request is not associated with the logical address that has an active WLSR element.

At block 466, the method 456 can include ignoring the sPPR request, replacing a previous repair match, or setting a new sPPR match that has precedence over the previous sPPR match in response to determining the sPPR request is associated with the logical address that has the active WLSR element. In some embodiments, the sPPR request can be ignored if a physical address associated with the WLSR element is different than a physical address associated with the sPPR request. Further, the sPPR request can be ignored if a repair has previously been performed on the memory page associated with the logical address associated with the sPPR request.

In some embodiments, a previous sPPR match can be replaced if a physical address associated with the sPPR request is a same physical address as a physical address associated with the WLSR element. Replacing the previous sPPR match can replace the data of a memory page that was repaired by a WLSR with the data of a page repaired by a sPPR. This can free the WLSR element that was used to repair the page such that the WLSR element can be used to repair a different memory page. In some embodiments, a controller can detect a fail at a physical memory address. This detection can indicate that the redundant memory page used to repair the memory page is no longer suitable for use as a redundant memory page. As used herein, the term "redundant memory page" refers to a page of memory to which data addressed to a different page of memory is diverted. That redundant memory page can be replaced with a new redundant memory page by canceling the association of the previous redundant page of memory with the sPPR and associating the new redundant memory page with sPPR.

In some embodiments, instead of replacing the association of the previous redundant page of memory with the sPPR, a new redundant page of memory can be associated with the sPPR while the previous redundant page is still associated with the sPPR. When the previous redundant memory and the new redundant memory are both associated with the sPPR, the new redundant memory page can take precedence over the previous redundant memory (e.g., the new redundant memory can be used in the sPPR instead of the previous redundant memory).

Figure 5:
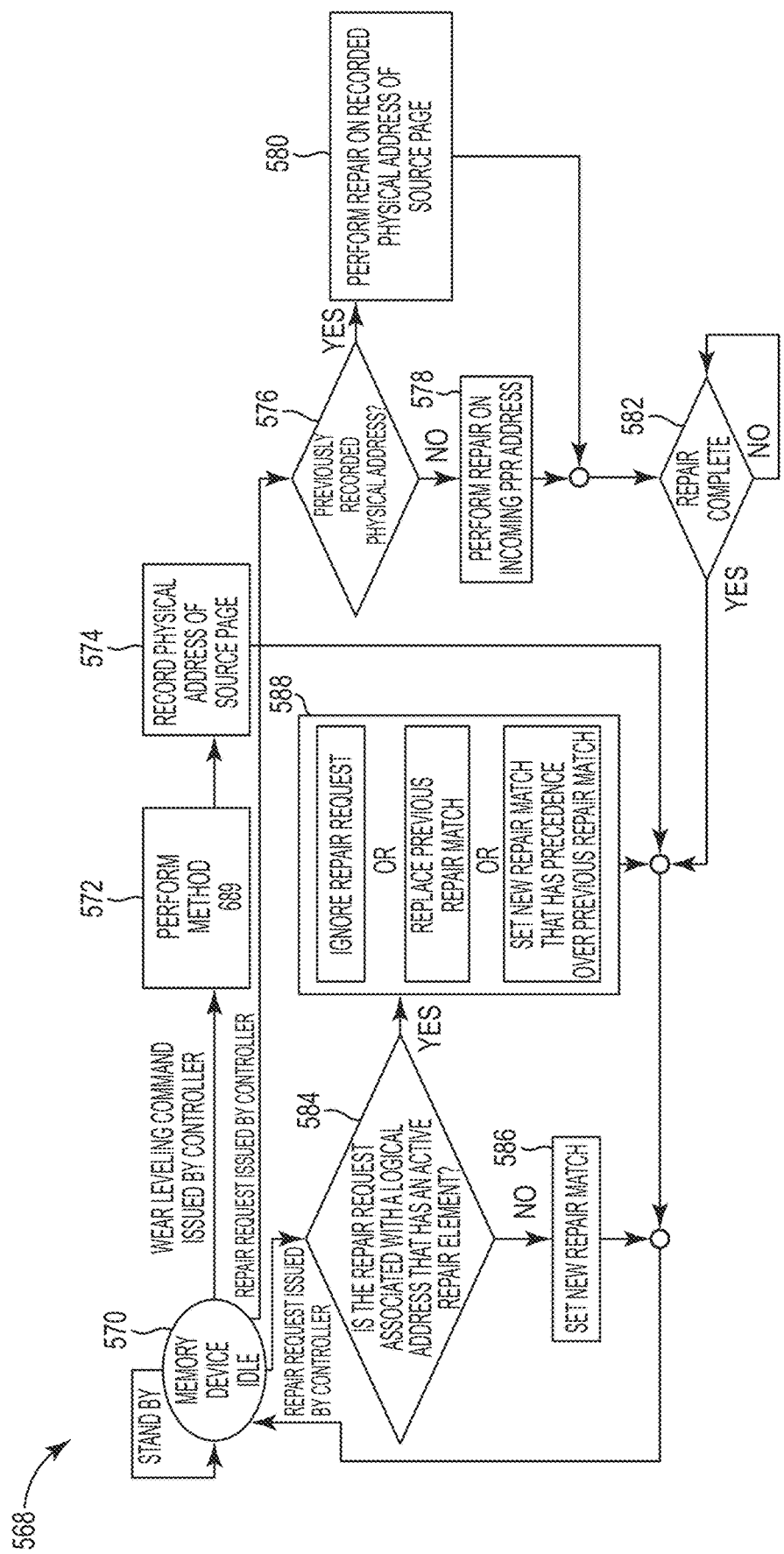
FIG. 5 is a flow diagram illustrating a method of wear leveling repair in a memory device in accordance with an embodiment of the present disclosure.

FIG. 5 is a flow diagram illustrating a method 568 for wear leveling repair in a memory device (e.g., memory device 130 previously described in connection with FIG. 1) in accordance with an embodiment of the present disclosure. The method 568 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. As an example, the method 568 can be performed by wear leveling repair circuitry 113 previously described in connection with FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 570, the method 568 can include a memory device being idle. The memory device can receive, from a host (e.g., host system 120 described in connection with FIG. 1), a wear leveling command. At block 572, the method 568 can include performing method 689 described later in connection with FIG. 6 in response to the memory device receiving the wear leveling command from the host.

At block 574, the method 568 can include recording a physical address of a source page. In some embodiments, the physical address of the source page can be recorded for a use in a future hard post package repair (hPPR). Further, in some embodiments, the memory device can send an alert to a controller (e.g., a controller of the host) to notify the controller that a wear leveling repair (e.g., a WLSR) has occurred in response to the WLSR repairing the source page. The alert can allow the controller to have an option on whether to convert an automated repair to a hard repair. If the controller decides to convert the automated repair into a hard repair, the controller can request a hPPR and the hPPR can perform the repair on the previously saved physical address.

The memory device can receive, from the host, a hPPR request. At block 576, the method 568 can include determining whether the physical address of the source page was previously recorded. At block 578, the method 568 can include performing a hPPR on an incoming post package repair (PPR) address (e.g., an address for a memory page associated with the incoming request PPR) in response to determining the physical address of the source page was not previously recorded. The hPPR repairs can be hard repairs. In some embodiments, the hPPR repairs in a memory device can persist if the memory device loses power. In some embodiments, the hPPR request can be issued after the wear leveling command is issued to the memory device.

At block 580, the method 568 can include performing a hPPR on the recorded physical address of the source page in response to determining the physical address was recorded previously. In some embodiments, a temporary volatile page repair associated with a WLSR element can be cleared prior to performing the hPPR on the physical address associated with the WLSR element. Clearing the WLSR element can replace the WLSR element with the hPPR to make the repair non-volatile (e.g., hard).

At block 582, the method 568 can include determining whether the hPPR request has been completed. If the hPPR request has not been completed, the memory device can continue to check whether the hPPR request was completed until the hPPR request has been completed.

At block 584, the method 568 can include determining whether a sPPR request is associated with a logical address that has an active WLSR element in response to the memory device receiving a sPPR request from the host. At block 586, the method 568 can include setting a new sPPR match in response to determining the sPPR request is not associated with a logical block address that has an active WLSR element.

At block 588, the method 568 can include ignoring the sPPR request, replacing a previous sPPR match, or setting a new sPPR match that has precedence over the previous sPPR match in response to determining the sPPR request is associated with a logical address that has an active WLSR element. In some embodiments, sPPR elements for the WLSR can remain unknown to the controller to ensure there are specific sPPR elements reserved exclusively for the WLSR.

Figure 6:
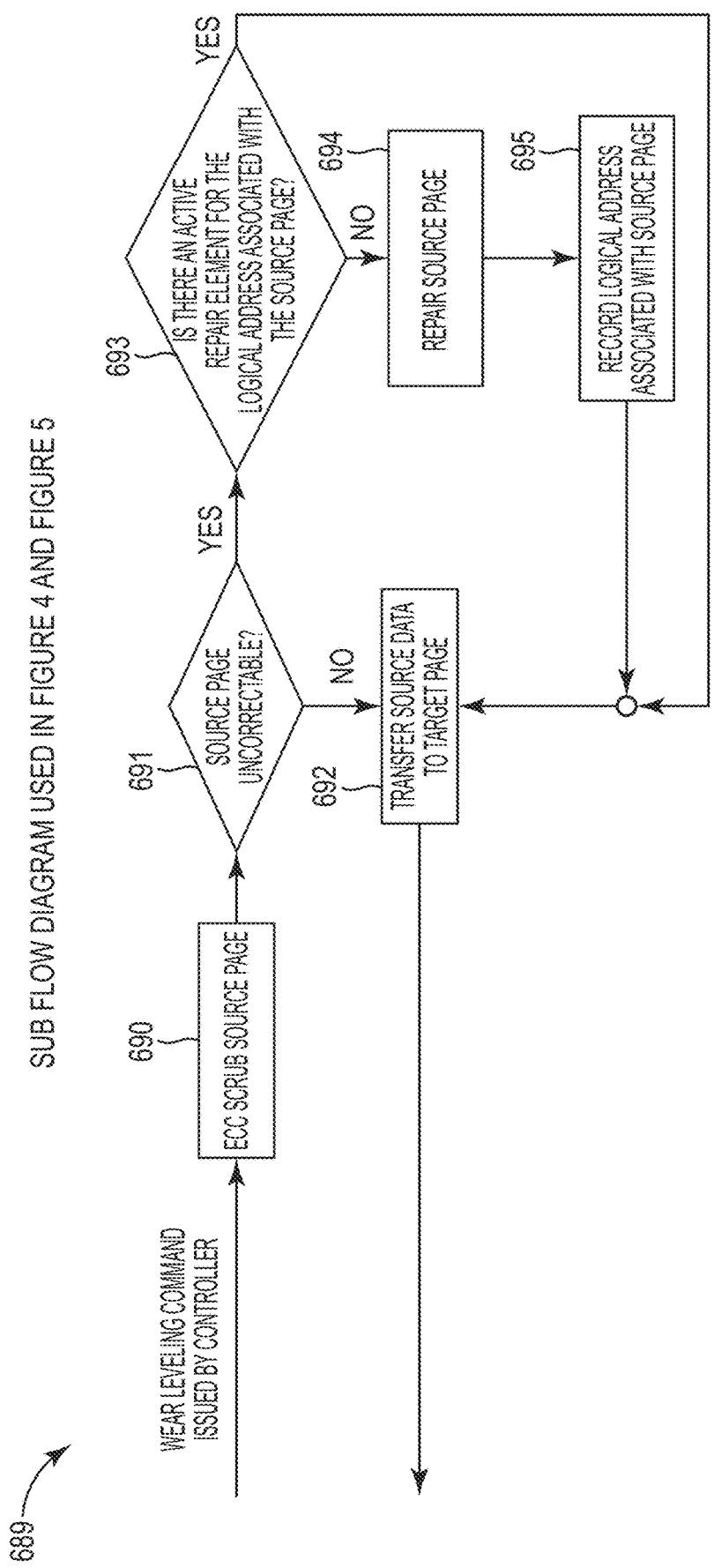
FIG. 6 is a flow diagram illustrating a method of wear leveling repair in a memory device in accordance with an embodiment of the present disclosure.

FIG. 6 is a flow diagram illustrating a method 689 for wear leveling repair in a memory device (e.g., memory device 130 previously described in connection with FIG. 1) in accordance with an embodiment of the present disclosure. The method 689 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. As an example, the method 689 can be performed by wear leveling repair circuitry 113 previously described in connection with FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Method 689 can be a portion of methods 456 and 568 described in FIGS. 4 and 5, respectively. For instance, method 689 corresponds to block 460 in FIG. 4 and block 572 in FIG. 5.

At block 690, the method 689 can include scrubbing, by the memory device using ECC circuitry, source data in response to receiving the wear leveling command. In some embodiments, an ECC scrub can include using ECC circuitry to correct errors in source data and write the corrected data back to the source page.

At block 691, the method 689 can include determining whether the source data includes an uncorrectable error. The source data can include an uncorrectable error if the ECC scrub is not capable of correcting errors in the source data. At block 692, the method 689 can include transferring the source data to a target page in a memory array of the memory device in response to determining the source data does not include an uncorrectable error.

At block 693, the method 689 can include determining whether there is an active wear leveling repair (e.g., WLSR) element for the logical address associated with the source page in response to determining the source data includes an uncorrectable error. In some embodiments, there can be a single WLSR element per memory page and in other embodiments there can be multiple WLSR elements per memory page. Further, in some embodiments, a first type of wear leveling repair can be performed if there is one wear leveling element per memory array and a second type of wear leveling repair can be performed if there is more than one wear leveling element per memory array. For example, a simplified wear leveling repair (such as method 332 in FIG. 3) can be performed if there is one wear leveling element per memory array and a more complex wear leveling repair (such as method 456 in FIG. 4 and method 568 in FIG. 5) can be performed if there is more than one wear leveling element per memory array. In some embodiments, the source data can be transferred to the target page in response to determining the source data includes an uncorrectable error and determining there is an active WLSR element for the logical address associated with the source page.

At block 694, the method 689 can include repairing the source page in response to determining the source data includes an uncorrectable error and determining there is no active WLSR element for the logical address associated with the source page. In some embodiments, the source page can be repaired immediately after determining there is no active WLSR element for the logical address and be repaired automatically with a temporary volatile page repair.

At block 695, the method 689 can include recording the logical address associated with the source page at the time of the temporary volatile page repair. The logical address associated with the source page can be recorded after a WLSR is performed on the source page in case the controller issues a sPPR request associated with that same logical address. Further, the logical address associated with the source page can be recorded to ensure the data that includes the uncorrectable error does not trigger an unnecessary WLSR. The source data can be transferred to the target page after the logical address associated with the source page is recorded, as illustrated at block 692.

Figure 7:
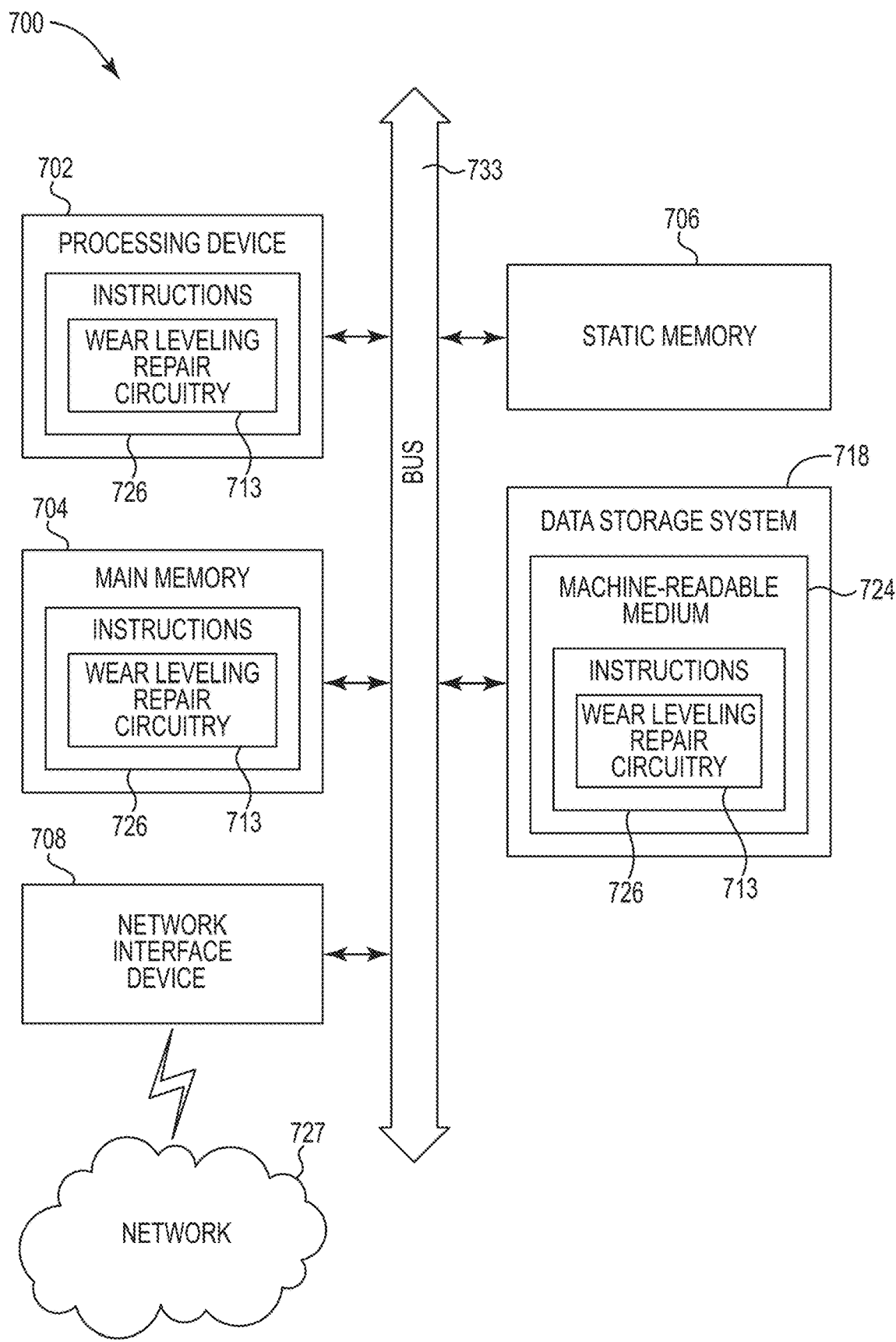
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 in FIG. 1) that includes, is coupled to, or utilizes a memory sub-system (e.g., the memory sub-system 110 in FIG. 1) or can be used to perform the operations of a controller (e.g., to execute an operating system to perform operations corresponding to the periodic and wear leveling repair circuitry 113 in FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 733.

The processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 727.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 in FIG. 1.

In one embodiment, the instructions 726 include instructions to implement functionality corresponding to wear leveling repair circuitry 713. While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

The present disclosure includes devices, methods, and systems supporting wear leveling circuitry. A number of embodiments include configurations of periodic and activity-based memory management circuitry.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. The combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
a host configured to:
issue a wear leveling command to a memory device; and
issue a repair request to the memory device; and
the memory device, wherein the memory device is configured to:
check source data in a memory of the memory device for errors in response to receiving the wear leveling command from the host;
transfer the source data in the memory of the memory device to a target page in the memory;
repair a source page in the memory if the source data includes an error and a wear leveling repair element has not been consumed;
set a new repair match if a wear leveling repair element has not been consumed in response to receiving the repair request from the host; and
flush a previous repair match prior to setting the new repair match if the wear leveling repair element has been consumed and a physical address of an incoming repair request is a physical address associated with the wear leveling repair element.

2. The system of claim 1, wherein the memory device includes error correction (ECC) circuitry to scrub the source data in response to receiving the wear leveling command from the host.

3. The system of claim 1, wherein the source page is repaired using a temporary volatile page repair.

4. The system of claim 3, wherein the temporary volatile page repair includes performing the repair request or performing of the wear leveling repair.

5. The system of claim 3, wherein the temporary volatile page repair is deleted responsive to the memory device losing power.

6. The system of claim 3, wherein the temporary volatile page repair is performed after each power up cycle of the memory device in which the temporary volatile page repair repairs a physical address associated with a page in the memory that includes the uncorrectable error.

7. The system of claim 1, wherein the wear leveling repair element is consumed while the source page is being repaired.

8. The system of claim 1, wherein the repair request is issued after the wear leveling command is issued.

9. A method, comprising:
receiving, by a memory device from a host, a wear leveling command;
checking, by the memory device, source data in a memory array of the memory device for errors in response to receiving the wear leveling command from the host;
transferring the source data to a target page in the memory array of the memory device;
repairing the source page in response to determining the source data includes an error and determining there is no active wear leveling repair element for the logical address associated with the source page;
receiving, by the memory device from the host, a repair request;
setting a new repair match in response to determining the repair request is not associated with a logical address that has the active wear leveling repair element; and
ignoring the repair request, replacing a previous repair match, or setting a new repair match that has precedence over the previous repair match in response to determining the repair request is associated with the logical address that has the active wear leveling repair element.

10. The method of claim 9, further comprising receiving the repair request independent of receiving the wear leveling command.

11. The method of claim 9, further comprising automatically repairing the source page using a temporary volatile page repair.

12. The method of claim 9, further comprising recording the logical address associated with the source page while repairing the source page.

13. The method of claim 9, further comprising ignoring the repair request if a physical address associated with the wear leveling repair element is different than a physical address associated with the repair request.

14. The method of claim 9, further comprising ignoring the repair request if a repair has previously been performed on a logical address associated with the repair request.

15. The method of claim 9, further comprising replacing the previous repair match if a physical address associated with the repair request is a same physical address as a physical address associated with the wear leveling repair element.

16. A method, comprising:
- receiving, by a memory device from a host, a wear leveling command;
- checking, by the memory device, source data in an array of memory cells of the memory device for errors in response to receiving the wear leveling command from the host;
- transferring the source data to a target page in the array of memory cells of the memory device;
- repairing the source page in response to determining the source data includes an error and determining there is no wear leveling repair element for the logical address associated with the source page;
- recording a physical address of the source page;
- receiving, by the memory device from the host, a repair request;
- performing a repair on the recorded physical address of the source page in response to determining the physical address was recorded previously; and
- performing the repair on an incoming address in response to determining the physical address of the source page was not recorded previously.

17. The method of claim 16, further comprising clearing a temporary volatile page repair associated with the wear leveling repair element prior to performing the repair on a physical address associated with the wear leveling element.

18. The method of claim 16, further comprising determining whether the repair request has been completed.

19. The method of claim 16, wherein the repair persists if the memory device loses power.

20. The method of claim 16, further comprising notifying the host that a wear leveling repair has occurred responsive to the wear leveling repair repairing the source page.

* * * * *